(12) United States Patent
Harrington et al.

(10) Patent No.: US 10,739,464 B2
(45) Date of Patent: Aug. 11, 2020

(54) SATELLITE MODEM LOCATION TRACKING

(71) Applicant: Hughes Network Systems, LLC, Germantown, MD (US)

(72) Inventors: Emanuel Girard Harrington, Bowie, MD (US); Dillon James Nichols, North Bethesda, MD (US); Yong Kang Yuan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 299 days.

(21) Appl. No.: 14/802,705

(22) Filed: Jul. 17, 2015

(65) Prior Publication Data
US 2017/0016992 A1    Jan. 19, 2017

(51) Int. Cl.
*G01S 19/14* (2010.01)
*H04B 7/185* (2006.01)
(Continued)

(52) U.S. Cl.
CPC .......... *G01S 19/14* (2013.01); *H04B 7/18517* (2013.01); *H04B 7/18593* (2013.01);
(Continued)

(58) Field of Classification Search
CPC .......... G01S 19/03; G01S 19/05; G01S 19/06; G01S 19/10; G01S 19/11; G01S 19/12;
(Continued)

(56) References Cited

U.S. PATENT DOCUMENTS

| 6,133,867 A * | 10/2000 | Eberwine ............. G01S 5/0072 342/125 |
| 6,839,851 B1 * | 1/2005 | Saitoh ................... H04N 5/913 348/E7.056 |

(Continued)

FOREIGN PATENT DOCUMENTS

| WO | 1996035293 A1 | 11/1996 |
| WO | 2004095867 A1 | 11/2004 |
| WO | 2016151039 A1 | 9/2016 |

OTHER PUBLICATIONS

PCT Application No. PCT/US2016/042639, The International Search Report and the Written Opinion of the International Searching Authority, dated Apr. 18, 2017 from the European Patent Office.

*Primary Examiner* — Olumide Ajibade Akonai
(74) *Attorney, Agent, or Firm* — Edell, Shapiro & Finnan LLC; Richard C. Irving

(57) ABSTRACT

A satellite modem, a GPS device, and a method are provided. The satellite modem requests current location information from a GPS device and waits no more than a preconfigured amount of time to receive the current location information. When the satellite modem receives the current location information, the satellite modem determines whether the current location information indicates a location in which the satellite modem is authorized to operate. When the satellite modem determines that the current location information indicates a location in which the satellite modem is not authorized to operate, the satellite modem performs at least one action from a group of actions including preventing the satellite modem from operating normally, permitting the satellite modem to operate with a reduced functionality, and transmitting a message to a network management center indicating that the satellite modem is not located at an authorized location.

16 Claims, 8 Drawing Sheets

(51) Int. Cl.
*G06F 21/44* (2013.01)
*H04W 12/06* (2009.01)

(52) U.S. Cl.
CPC ...... *G06F 21/44* (2013.01); *G06F 2221/2129* (2013.01); *H04W 12/06* (2013.01)

(58) Field of Classification Search
CPC .......... G01S 19/14; G01S 19/25; G01S 19/42; G01S 19/08; G01S 19/16; H04B 7/18517; H04B 7/18528; H04B 7/18539; H04B 7/18545; H04B 7/18547; H04B 7/1855; H04B 7/18554; H04B 7/18565; H04B 7/1851; G06F 21/44; G06F 2221/2111; G06F 21/62; G06F 2221/2129; H04W 12/06; H04W 12/08; H04L 63/107
See application file for complete search history.

(56) References Cited

U.S. PATENT DOCUMENTS

| | | | | |
|---|---|---|---|---|
| 2002/0154777 A1* | 10/2002 | Candelore | ............ | H04L 9/0822 380/247 |
| 2003/0005324 A1* | 1/2003 | Epstein | .................. | G06F 21/10 726/21 |
| 2004/0268131 A1* | 12/2004 | Kudo | .................... | H04L 63/061 713/182 |
| 2005/0210261 A1* | 9/2005 | Kamperman | ........... | G06F 21/10 713/182 |
| 2007/0149218 A1* | 6/2007 | Lee | .................. | G01S 19/14 455/456.3 |
| 2007/0162664 A1* | 7/2007 | Guzman | ................ | H04N 7/163 710/62 |
| 2007/0208749 A1* | 9/2007 | Price | .................. | G06Q 30/0253 |
| 2008/0115180 A1* | 5/2008 | Casavant | ........... | H04N 7/17318 725/100 |
| 2008/0120682 A1* | 5/2008 | Hardacker | ............. | H04N 7/163 725/141 |
| 2008/0178226 A1* | 7/2008 | Lee | ...................... | H04W 48/16 725/68 |
| 2008/0289033 A1* | 11/2008 | Hamilton | .............. | G06F 21/445 726/19 |
| 2009/0011777 A1* | 1/2009 | Grunebach | ........... | H04W 4/02 455/456.3 |
| 2009/0100260 A1* | 4/2009 | Govindarajan | ....... | H04L 9/0872 713/155 |
| 2009/0100530 A1* | 4/2009 | Chen | ..................... | H04L 9/3271 726/29 |
| 2012/0001797 A1* | 1/2012 | Ling | ...................... | G01S 19/05 342/357.42 |
| 2013/0061291 A1* | 3/2013 | Hegg | ..................... | G06F 21/33 726/4 |
| 2013/0127665 A1* | 5/2013 | Miller | .................. | H01Q 1/1257 342/359 |
| 2015/0355334 A1* | 12/2015 | Stubbs | .................... | G01S 19/02 342/357.395 |
| 2018/0198542 A1* | 7/2018 | James | ................... | H04H 40/90 |

* cited by examiner

US 10,739,464 B2

SATELLITE MODEM LOCATION TRACKING

FIELD OF THE INVENTION

The invention relates to a satellite modem installation tool which includes a global positioning system (GPS) that communicates with a satellite modem. In particular, the invention relates to a GPS device that is logically connected to a satellite modem during installation of the satellite modem and remains connected during normal operation of the satellite modem such that a service provider may track a location of the satellite modem.

BACKGROUND

During installation and use of a customer's portion of a satellite communication system, including a satellite modem and an associated outdoor unit, the customer's portion communicates via a beam of the satellite communication system. A service provider may use a network operation console in a network management center to determine on which beam the customer's portion is communicating. A beam may provide satellite coverage over an area that includes multiple territories or jurisdictions.

Customers of the service provider have an agreement with the service provider, in which the customers agreed to use their respective customer portions only in one or more authorized territories or jurisdictions. Although existing systems report a beam on which a customer's portion is communicating, if the beam covers an area including both authorized and unauthorized territories or jurisdictions, it is not possible to know whether the customer's portion is operating in an unauthorized territory or jurisdiction.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first aspect, a satellite modem of an indoor unit is provided. The satellite modem may include a transceiver and a microcontroller. The transceiver transmits signals via an inter-facility link that connects the satellite modem with an outdoor unit of a very small aperture terminal. The microcontroller has instructions recorded in a memory such that when the microcontroller executes the instructions, the satellite modem requests location information from a GPS device and waits up to a pre-configured amount of time to receive the location information from the GPS device. When the satellite modem receives the location information, the satellite modem may determine whether the location information indicates a location in which the satellite modem is authorized to operate. When the satellite modem determines that the location information indicates a location in which the satellite modem is not authorized to operate, the satellite modem may perform one or more actions from a group of actions consisting of: preventing the satellite modem from operating, permitting the satellite modem to operate with a reduced functionality, and transmitting a message to a network management center indicating that the satellite modem is located at an unauthorized location.

In a second aspect, a GPS device for use with a satellite modem is provided. The GPS device may include a first receiver, a transceiver, and a microcontroller. The first receiver may receive signals from multiple sources. The GPS device uses the signals to determine a current location. The transceiver may be used to communicate with the satellite modem. The microcontroller may communicate with the first receiver and the transceiver. The microcontroller has a memory which includes multiple instructions. When the microcontroller executes the multiple instructions, the microcontroller causes the GPS device to perform a method that includes determining the current location of the GPS device and transmitting information indicating the current location to the satellite modem.

In a third aspect, a method implemented by a satellite modem is provided. The satellite modem requests current location information from a GPS device and waits no more than a preconfigured amount of time to receive the current location information from the GPS device. When the satellite modem receives the current location information, the satellite modem determines whether the current location information indicates a location in which the satellite modem is authorized to operate. When the satellite modem determines that the current location information indicates a location in which the satellite modem is not authorized to operate, the satellite modem performs one or more actions selected from a group of actions consisting of: preventing the satellite modem from operating normally, permitting the satellite modem to operate with a reduced functionality, and transmitting a message to a network management center indicating that the satellite modem is not located at an authorized location.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, a very small aperture terminal (VSAT) global positioning system (GPS) device may be co-located with a satellite modem. The VSAT GPS device may be connected in line to an inter-facility link (IFL) connecting the satellite modem to an outdoor unit. In some embodiments, the VSAT GPS device may be integrated with the outdoor unit, powered by the satellite modem located indoors, and may communicate with the satellite modem via the IFL. In other embodiments, the VSAT GPS device may be powered by a battery, may communicate with the satellite modem wirelessly, and may be located within a wireless communication range of the satellite modem. In additional embodiments, the VSAT GPS device may be integral to the satellite modem and connected to an antenna capable of sending and receiving signals to GPS satellites.

The satellite modem may request and receive location information from the VSAT GPS device. The satellite modem may determine, based on the received location information, whether the satellite modem is located at a location in which the satellite modem is authorized to operate. If the satellite modem is located at the location in which the satellite modem is authorized to operate, then the satellite modem may operate normally. Otherwise, if the satellite modem is located at a location in which the satellite modem is not authorized to operate, then the satellite modem may perform at least one action selected from a group of actions. The group of actions may consist of: sending a message to a network management center indicating that the satellite modem is located at the location in which the satellite modem is not authorized to operate; cease operation; and operate with reduced functionality.

In some embodiments, if the satellite modem is unable to obtain the location information, then the satellite modem may perform at least one second action from a group of second actions consisting of: sending a message to the network management center indicating that the satellite modem is unable to obtain location information; operate with reduced functionality; and cease operation.

Operational Environment

Figure 1:
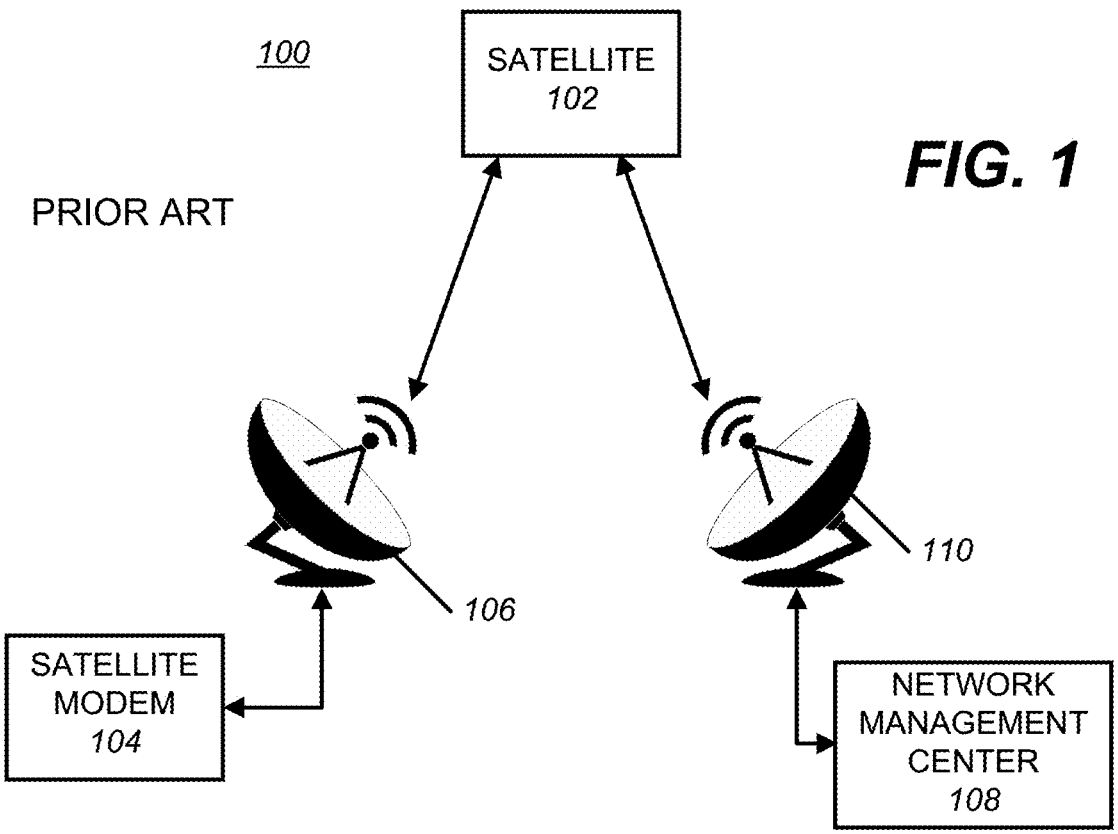
FIG. 1 illustrates an exemplary prior art operational environment.

FIG. 1 shows an exemplary prior art operational environment 100. Operational environment 100 may include a satellite 102, a satellite modem 104, an outdoor unit 106 which includes a VSAT antenna, a network management center 108, and an outdoor unit 110, including a second VSAT antenna. In operational environment 100, because satellite modem 104 does not receive information regarding a current location of satellite modem 104, it is possible to place satellite modem 104 in a location at which it is not authorized to operate. For example, if satellite modem 104 is authorized for operation only within the United States, it is possible to move satellite modem 104 to Canada and have it operate normally. However, network management center 108 may receive information from satellite modem 104 regarding a satellite beam in which satellite modem 104 is operating. If the satellite beam in which satellite modem 104 is operating includes only an unauthorized area, then an operator at network management center 108 may determine that the satellite modem 104 is located in the unauthorized area. If satellite modem 104 is operating in a beam that covers an unauthorized area and an authorized area, then it is not possible to determine in which of the areas satellite modem 104 is located.

Figure 2:
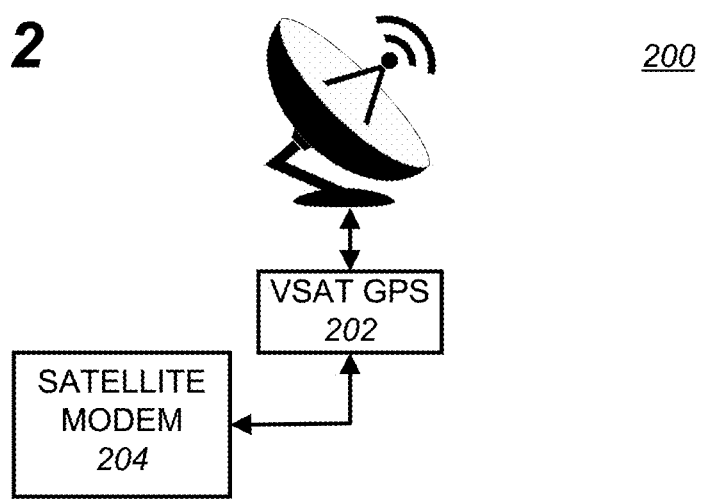
FIGS. 2-4 shows portions of operating environments for various embodiments.

FIG. 2 shows a portion of operating environment 200 in which embodiments of the invention may operate. Operating environment 200 may be identical to operating environment 100 with the exception of a satellite modem 204 replacing satellite modem 104 of operating environment 100 and VSAT GPS device 202 connected in line with respect to an IFL connecting satellite modem 204 with outdoor unit 106. VSAT GPS device 202 may provide location information to satellite modem 204. In some embodiments, VSAT GPS device 202 and satellite modem 204 may communicate with each other using the DiSEqC protocol. In one implementation, satellite modem 204 may send the data to VSAT GPS device 202 at a frequency of 2.5 MHz and VSAT GPS device 202 may respond to satellite modem 204 at a frequency of 1 MHz.

VSAT GPS device 202 may be powered by satellite modem 204. In some embodiments, VSAT GPS device 202 may be integrated into an indoor unit which includes satellite modem 204, or may be installed inside customer premises at a location for receiving a GPS signal.

Figure 3:
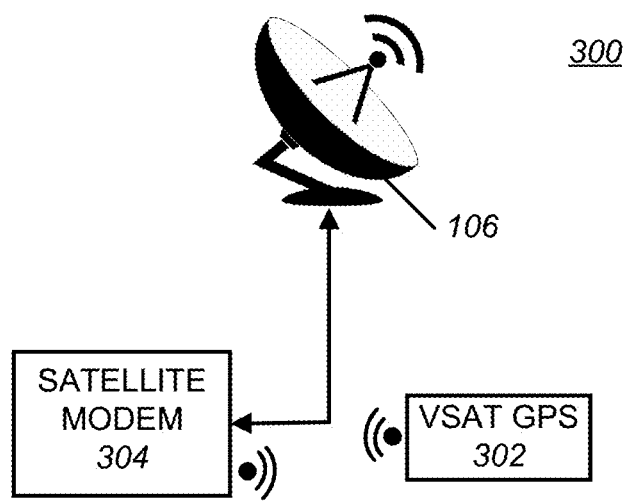

FIG. 3 shows a portion of an operating environment 300 in which embodiments of the invention may operate. Operating environment 300 may be identical to operating environment 100 with the exception of a satellite modem 304 replacing satellite modem 104 of operating environment 100 and a VSAT GPS device 302 connected wirelessly to satellite modem 304. VSAT GPS device 302 may provide the location information to satellite modem 204. In some embodiments, VSAT GPS device 302 and satellite modem 304 may have a Wi-Fi connection. VSAT GPS device 302 may be powered by a battery. Some embodiments of VSAT GPS device 302 may be physically connected to a solar panel (not shown) which may provide power to the battery to be stored for later use.

Figure 4:
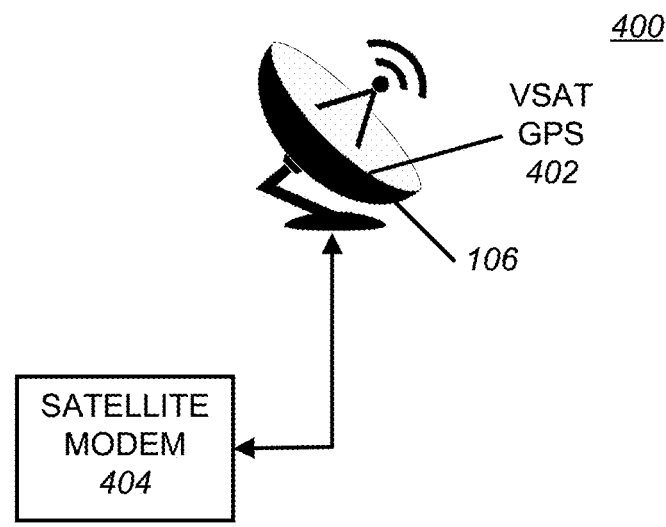

FIG. 4 shows a portion of an operating environment 400 in which embodiments of the invention may operate. Operating environment 400 may be identical to operating environment 100 with the exception of a satellite modem 404 replacing satellite modem 104 of operating environment 100 and a VSAT GPS device 402 integrated into outdoor unit 106 and either connected to satellite modem 404 via the IFL or wirelessly connected to satellite modem 404 via Wi-Fi or other wireless technology. When VSAT GPS device 402 is connected to satellite modem 404 via the IFL, VSAT GPS device 402 is powered by satellite modem 404. Otherwise, VSAT GPS device 402 may be battery-powered, as described previously. VSAT GPS device 402 may provide the location information to satellite modem 404.

Satellite Modem

Figure 5:
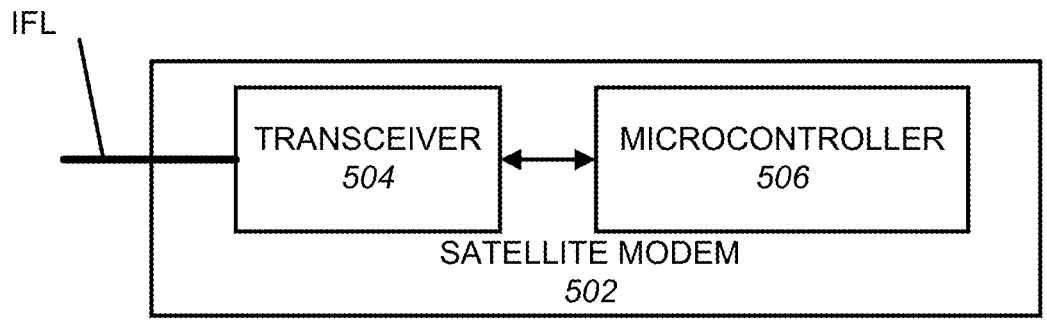
FIG. 5 illustrates a portion of a satellite modem which may be used in various embodiments.
Figure 6:
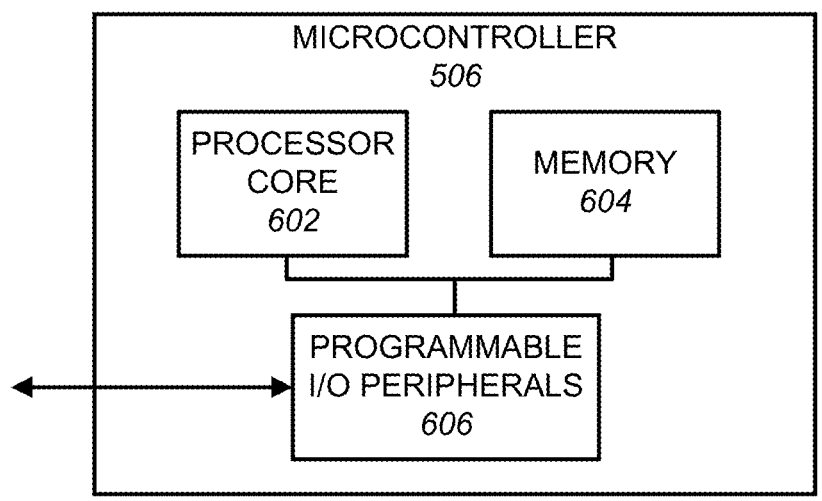
FIG. 6 illustrates, in more detail, a microcontroller of FIG. 5.

FIG. 5 is a functional block diagram illustrating at least a portion of a satellite modem 502, which may be implemented as satellite modem 204 or satellite modem 404 (when satellite modem 404 and VSAT GPS device 402 are connected via the IFL). Satellite modem 502 may include a transceiver 504 and a microcontroller 506. Transceiver 504 may send and receive information via the IFL. Microcontroller 506 is shown in more detail in FIG. 6.

Microcontroller 506 is a small computer on a single integrated circuit. The single integrated circuit may include a processor core 602, a memory 604, and programmable input/output peripherals 606. Microcontroller 506 may communicate with transceiver 504 via one or more programmable input/output peripherals 606. Memory 604 may include instructions for execution by processor core 602.

Figure 7:
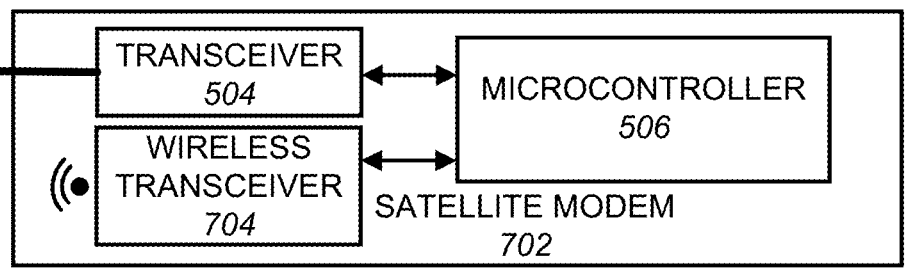
FIG. 7 illustrates a portion of a satellite modem which may be used in various embodiments.

FIG. 7 is a functional block diagram illustrating at least a portion of a satellite modem 702, which may be implemented as satellite modem 304 or satellite modem 404 (when satellite modem 404 and VSAT GPS device 402 are connected via a wireless connection). Satellite modem 702 may include a transceiver 504, a wireless transceiver 704, and microcontroller 506. Transceiver 504 may send to and receive information from an outdoor unit via an IFL. Wireless transceiver 704 may communicate wirelessly with VSAT GPS device 302, or VSAT GPS device 402 (when satellite modem 404 and VSAT GPS device 402 are connected via a wireless connection). One or more programmable input/output peripherals 606 (FIG. 6) may communicate with transceiver 504 and wireless transceiver 704.

Figure 8:
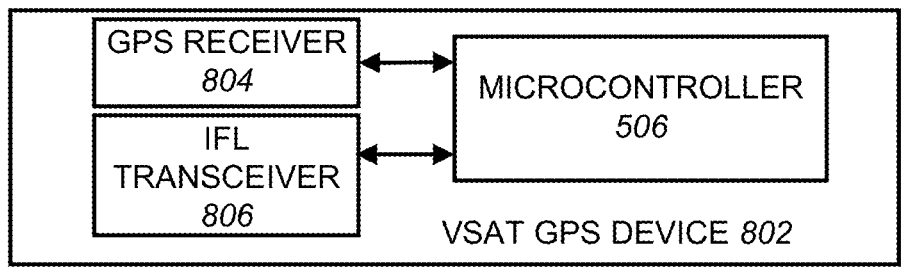
FIGS. 8-9 illustrate exemplary embodiments of a very small aperture terminal (VSAT) GPS device.

FIG. 8 is a functional block diagram of an exemplary VSAT GPS device 802 which may implement VSAT GPS device 202 (FIG. 2) and VSAT GPS device 402 (when connected to an IFL) (FIG. 4). VSAT GPS device 802 may include a GPS receiver 804, an IFL transceiver 806, and microcontroller 506. In some embodiments, GPS receiver 804 may receive data from multiple GPS satellites. IFL transceiver 806 sends data to and receives data from an outdoor unit, which may further communicate with remote devices via a satellite. A functional block diagram of microcontroller 506 was previously discussed with respect to FIG. 6. When microcontroller 506 is used in an implementation of VSAT GPS device 802, memory 604 may include instructions, which when executed by processor core 602 cause VSAT GPS device 802 to communicate with GPS receiver 804 and IFL transceiver 806 and perform operations consistent with VSAT GPS device 802.

Figure 9:
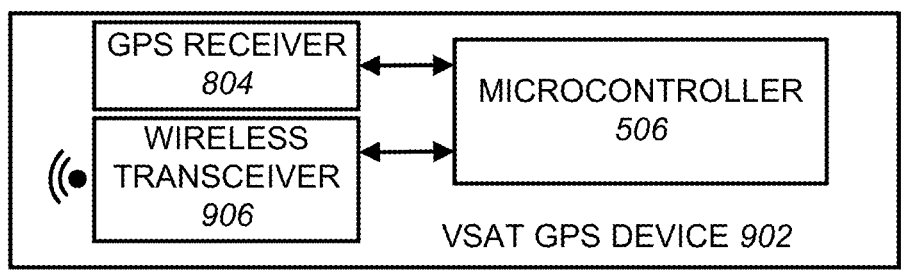

FIG. 9 is a functional block diagram of an exemplary VSAT GPS device 902 which may implement VSAT GPS device 302 (FIG. 3) and VSAT GPS device 402 (when wirelessly connected to a satellite modem) (FIG. 4). VSAT GPS device 902 may include a GPS receiver 804, a wireless transceiver 906, and microcontroller 506. In some embodiments, GPS receiver 804 may receive data from multiple GPS satellites. Wireless transceiver 906 sends data to and receives data from the satellite modem, which may further communicate with remote devices via an outdoor unit and a satellite. Microcontroller 506 was previously discussed with respect to FIG. 6. When microcontroller 506 is used in an implementation of VSAT GPS device 902, memory 604 may include instructions, which when executed by processor core 602 cause VSAT GPS device 902 to communicate with GPS receiver 804 and wireless transceiver 906 and perform operations consistent with VSAT GPS device 902.

Exemplary Operation

Figure 10:
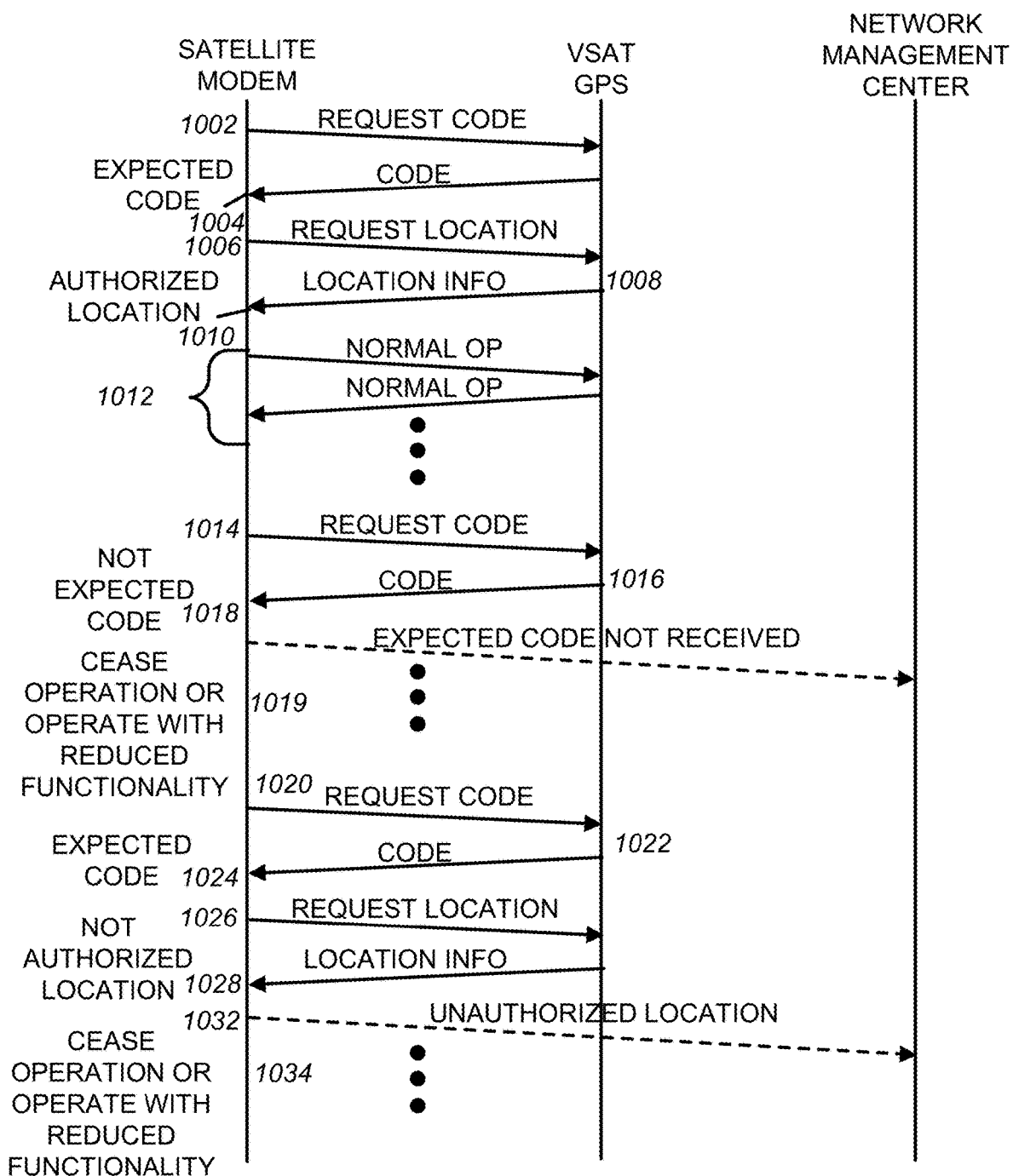
FIG. 10 shows exemplary operation of various embodiments.

FIG. 10 illustrates exemplary operation of various embodiments. When a satellite modem is installed, the satellite modem may send a message to a VSAT GPS device requesting a code (act 1002). In some embodiments, the requested code may be a serial number of the VSAT GPS device. During installation, the satellite modem may be configured to have the serial number, or code, of the VSAT GPS device. In response to receiving the request for the code, the VSAT GPS device may respond to the satellite modem with the serial number or the code (act 1004). If the received code matches the code or the serial number of the VSAT GPS device, configured during the installation, then the satellite modem may request location information from the VSAT GPS device (act 1006). The VSAT GPS device may receive the request for location information and may respond to the satellite modem with the location information (act 1008). The satellite modem may receive the location information and may determine whether the location information indicates that the satellite modem is at a location in which it is authorized to operate. In this example, the satellite modem determines that the location information indicates that the satellite modem is at the location in which it is authorized to operate (act 1010). The satellite modem may then operate normally (act 1012). The satellite modem may request the code following a power cycle or reset and may periodically request the code. Alternatively, instead of the satellite modem requesting the code, the VSAT GPS device may send the code to the satellite modem upon detecting a new connection with the satellite modem and may resend the code at periodic intervals such as, for example, every 3 hours, every 6 hours, or another suitable time period.

At a later time, satellite modem may again request the code from the VSAT GPS device (act 1014). In response to receiving the request for the code, the VSAT GPS device may respond with the code serial number (act 1016). In this example, the satellite modem receives the code from the VSAT GPS device and determines that the received code or serial number does not match the expected code (act 1018). As a result, the satellite modem may perform at least one action selected from a group of actions consisting of: sending a message to a network management center indicating that the expected code is not received from the VSAT GPS device; ceasing operation; and operating with reduced functionality (act 1019). Examples of operating with reduced functionality may include, but not be limited to: permitting the satellite modem to communicate with the management center, but not permitting the satellite modem to otherwise receive and send data; permitting the satellite modem to receive data from remote sources while not permitting the satellite modem to send data to remote destinations other than a network management center; or permitting the satellite modem to send data to remote destinations while not permitting the satellite modem to receive data from remote destinations.

At a later point in time, the satellite modem may send a request for the code to the VSAT GPS device (act 1020). The VSAT GPS device may receive the request for the code and may respond with the code (act 1022). The satellite modem may receive the code and may determine that the received code matches the expected code (act 1024). The satellite modem may then send a request for location information to the VSAT GPS device (act 1026). The VSAT GPS device may respond to the request for location information with the location information indicating a current location (act 1028). In this example, the satellite modem determines that the location information indicates a location at which the satellite modem is not authorized to operate. The satellite modem may then send a message to the network management center indicating that the satellite modem is in a location at which it is not authorized to operate (act 1032). The satellite modem may then either cease operation or operate with reduced functionality (act 1034). Operating with reduced functionality when the satellite modem is at an unauthorized location may include, but not be limited to, permit communications with the network management center while not permitting any other communications.

Figure 11:
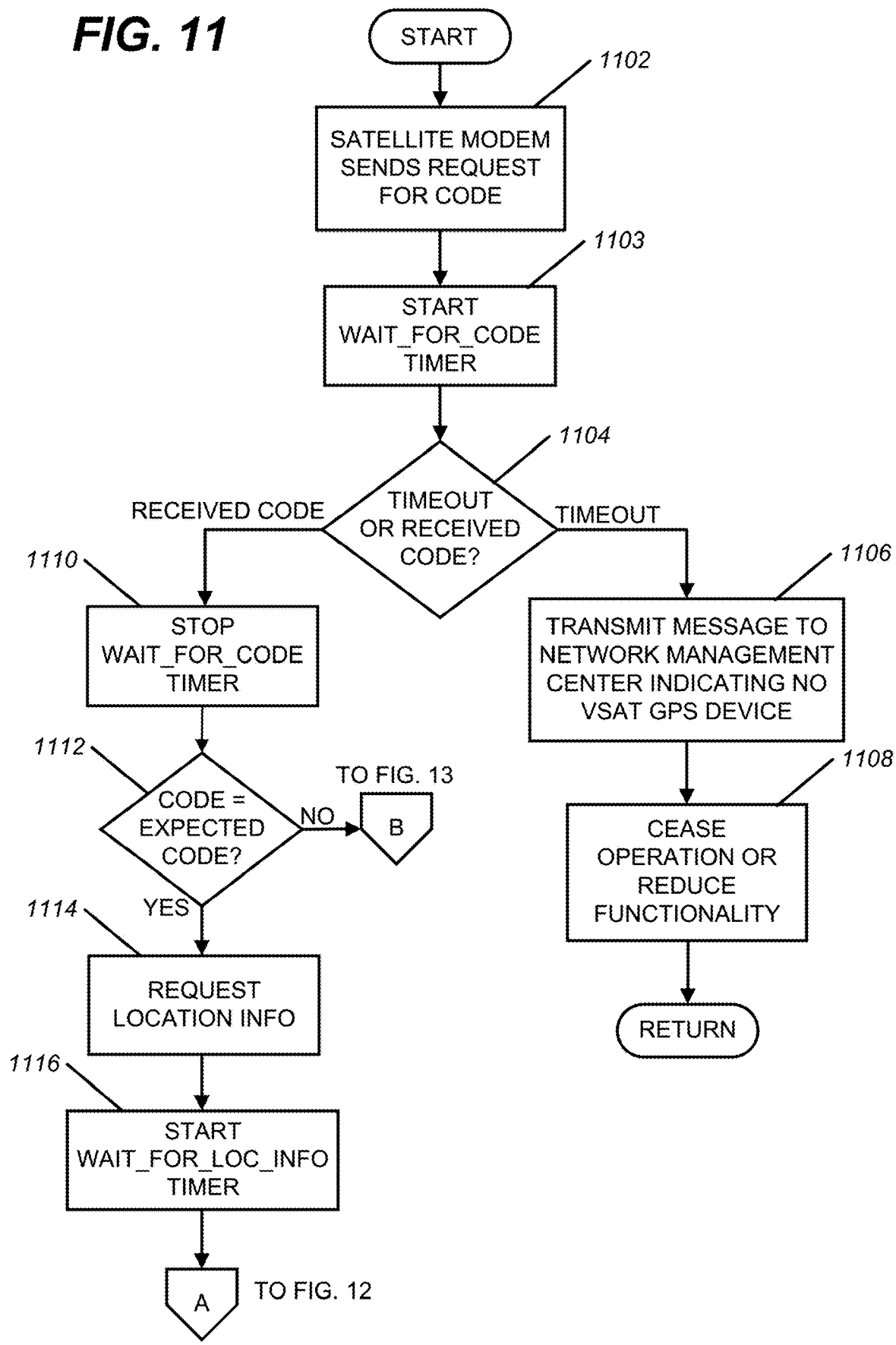
FIGS. 11-13 are flowcharts that explain exemplary processing in various embodiments.
Figure 12:
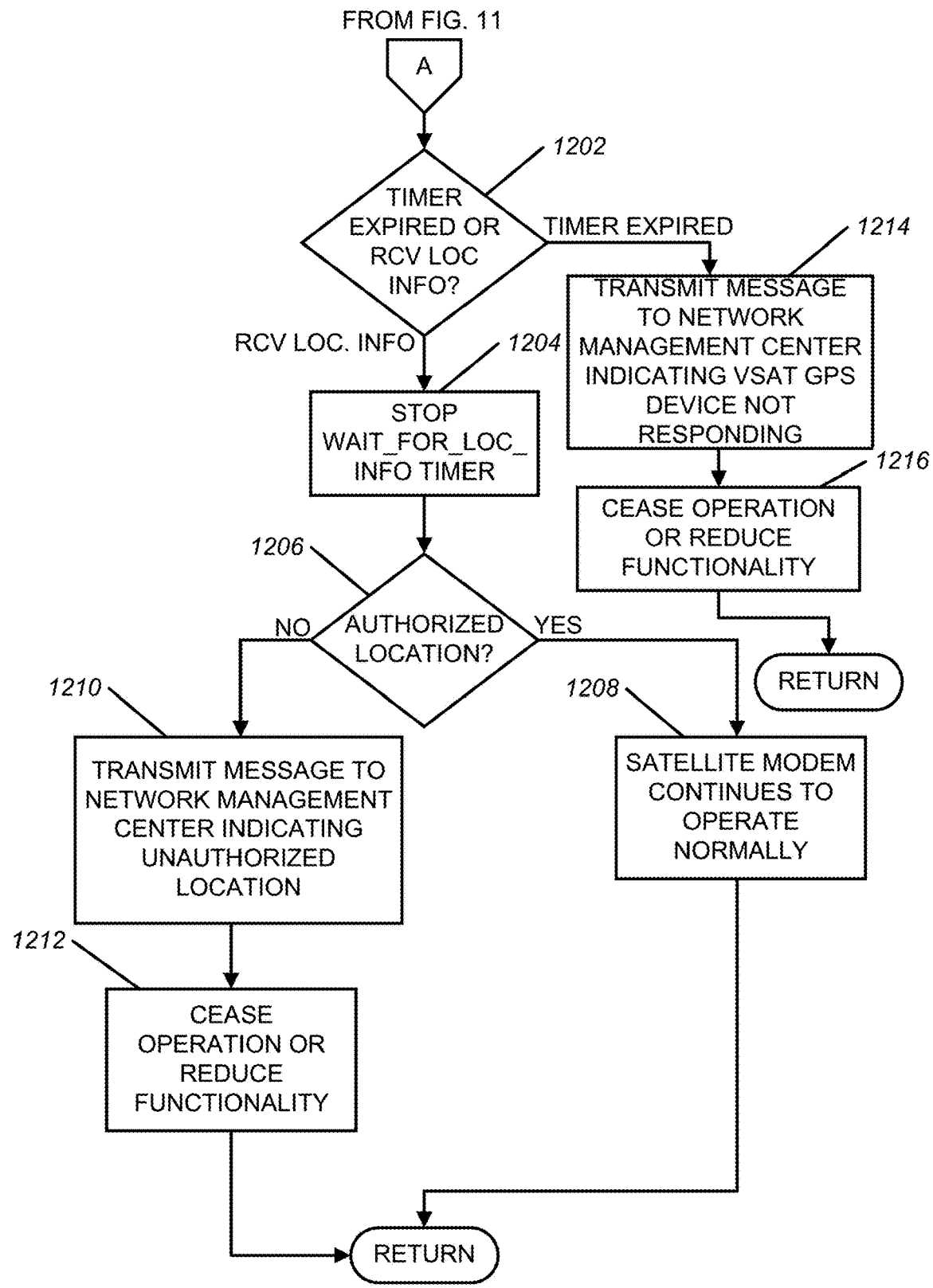
Figure 13:
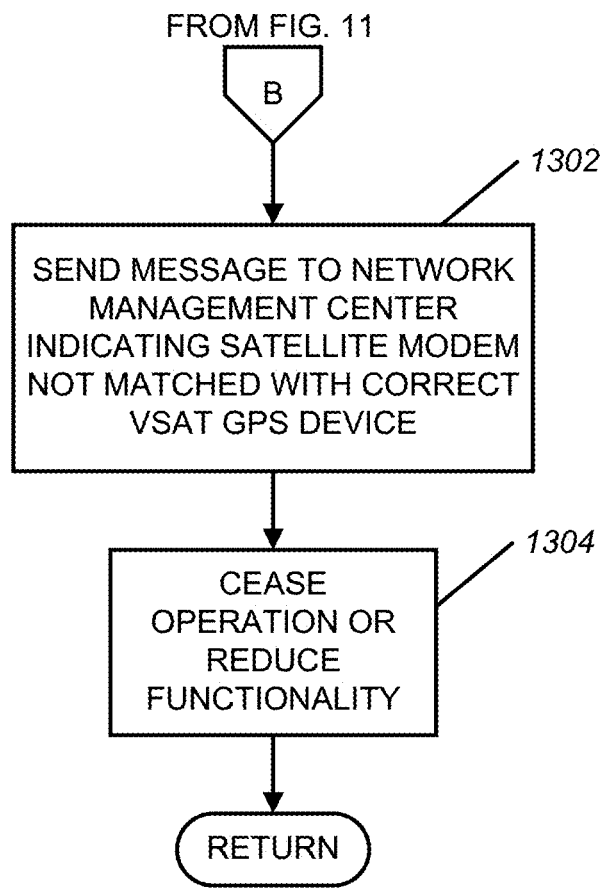

FIGS. 11-13 are flowcharts that illustrate exemplary processing in various embodiments. With reference to FIG. 11, after installing a satellite modem, the satellite modem may send a request to a VSAT GPS device for a code (act 1102).

In some embodiments, the code is a serial number of a VSAT GPS device that is matched with the satellite modem. That is, the satellite modem is configured to expect the matched VSAT GPS device to provide a particular code. The satellite modem may then start a timer to wait for the VSAT GPS device to provide the code to the satellite modem (act 1103). In some embodiments, the timer may be set to 30 seconds or another suitable time period.

At a later point in time, the satellite modem either may receive the code from the VSAT GPS device or the previously started timer may timeout waiting to receive the code (act 1104). If the previously started timer times out, then the satellite modem may transmit a message to a network management center, via an outdoor unit and a satellite, indicating that the satellite modem is unable to communicate with the VSAT GPS device (act 1106). The satellite modem may then cease normal operation or may operate with reduced functionality (act 1108). Processing may then be completed.

If during act 1104, the satellite modem determines that the code was received from the VSAT GPS device, then the satellite modem may stop the timer (act 1110) and may determine whether the received code is an expected code from the VSAT GPS device, which is matched with the satellite modem (act 1112). If the received code is the expected code, then the satellite modem may send a request to the VSAT GPS device for location information (act 1114) and may start a timer (act 1116). The timer may be 30 seconds or another suitable value. In response to receiving the request for location information, the VSAT GPS device may provide the location information. Next, either the timer from act 1116 expired or location information is received. The satellite modem may then determine whether the timer expired or the location information was received by the satellite modem (act 1202). If the location information was received, the satellite modem may stop the timer, which was started during act 1116 (act 1204) and may determine, based on the received location information, whether it is at a location in which it is authorized to operate (act 1206). If the satellite modem determines that it is at the location in which it is authorized to operate, then the satellite modem may continue to operate normally (act 1208). The process may then be completed.

If, during act 1206, the satellite modem determines, based on the location information, that it is at a location in which it is not authorized to operate, then the satellite modem may transmit a message to a network management center, via an outdoor unit and a satellite, indicating that the satellite modem is at a location in which it is not authorized to operate (act 1210). The satellite modem may then cease normal operation or may operate with reduced functionality (act 1212). The process may then be completed.

If, during act 1202, the satellite modem determines that the timer started during act 1116 expired, then the satellite modem may transmit a message to a network management center indicating that the VSAT GPS device associated with the satellite modem is not responding (act 1214) and may cease operation or operate with reduced functionality (act 1216).

If, during act 1112 (FIG. 11), the satellite modem determines that the received code does not match the expected code, then the satellite modem may send a message to the network management center, via the outdoor unit and the satellite, indicating that the satellite modem is not matched with a correct VSAT GPS device (act 1302; FIG. 13). The satellite modem then may either cease normal operation or operate with reduced functionality (act 1304). The process may then be completed.

Although FIGS. 10 and 11 illustrate the satellite modem sending a request for a code, in an alternate embodiment, the VSAT GPS device may send the code to the satellite modem upon detecting a connection with the satellite modem. Further, in some alternate embodiments, the VSAT GPS device may periodically send the code to the satellite modem. For example, the VSAT GPS device may send the code to the satellite modem every 3 hours, every 12 hours, once every 24 hours, or another suitable period of time. In the above-mentioned alternate embodiments, acts 1102-1110 may be eliminated because the code may be received from the VSAT GPS device unsolicited.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A system comprising:
a satellite modem of an indoor unit for use with a very small aperture terminal, the satellite modem being configured to have a predefined unique identifier of a particular GPS device during installation of the satellite modem; and
a GPS device co-located with the satellite modem and having the predefined unique identifier that uniquely identifies the GPS device as the particular GPS device, the GPS device being configured to transmit a first message including the predefined unique identifier to the satellite modem upon detecting a new connection with the satellite modem, wherein:
the satellite modem comprises:
a transceiver for transmitting and receiving signals via an inter-facility link connecting the satellite modem with an outdoor unit of the very small aperture terminal; and
a microcontroller having a plurality of instructions recorded in a memory, when the microcontroller executes the plurality of instructions the microcontroller is configured to:
receive the first message from the GPS device co-located with the satellite modem;
determine whether the received first message includes the predefined unique identifier identifying the GPS device as the particular GPS device;
when the first message is determined not to include the predefined unique identifier identifying the GPS device as the particular GPS device, perform:

informing a network management center regarding the first message not including the predefined unique identifier, and
permitting the satellite modem to operate with a reduced functionality; and
in response to determining that the received first message includes the predefined unique identifier identifying the GPS device as the particular GPS device, perform:
requesting location information from the GPS device,
receiving the location information from the GPS device in response to the requesting of the location information from the GPS device, and
in response to the receiving of the location information, the microcontroller is further configured to:
determine whether the location information indicates a location at which the satellite modem is authorized to operate, and
when the microcontroller determines that the location information indicates a location at which the satellite modem is not authorized to operate, perform:
permitting the satellite modem to operate with a reduced functionality, and
transmitting a message to the network management center indicating that the satellite modem is located at an unauthorized location.

2. The system of claim 1, wherein:
the satellite modem includes a wireless transceiver, and
the satellite modem wirelessly communicates with the GPS device.

3. The system of claim 2, wherein the satellite modem wirelessly communicates with the GPS device using WiFi.

4. The system of claim 1, wherein the satellite modem communicates with the GPS device via the inter-facility link.

5. The system of claim 4, wherein the satellite modem communicates with the GPS device using a DiSEqC protocol.

6. The system of claim 1, wherein the microcontroller is further configured to authorize the satellite modem to operate only when the microcontroller determines that the received first message includes the predefined unique identifier identifying the GPS device as the particular GPS device.

7. The system of claim 1, wherein the microcontroller is further configured to prevent operation of the satellite modem after waiting a first elapsed amount of time after the requesting of the location information from the GPS device without having received the location information.

8. The system of claim 1, wherein the GPS device is further configured to retransmit the first message including the predefined unique identifier at periodic intervals.

9. A method comprising:
during installation of a satellite modem of an indoor unit, configuring the satellite modem to have a predefined unique identifier of a particular GPS device;
transmitting, by a GPS device to a satellite modem, a first message including the predefined unique identifier identifying the GPS device as the particular GPS device upon detecting a new connection with the satellite modem, the GPS device being co-located with the satellite modem;
receiving, by the satellite modem, the first message from the GPS device;
determining, by the satellite modem, whether the received first message includes the predefined unique identifier identifying the GPS device as the particular GPS device;
when the received first message is determined not to include the predefined unique identifier identifying the GPS device as the particular GPS device, performing, by the satellite modem:
permitting the satellite modem to operate with reduced functionality, and
informing a network management center that the predefined unique identifier was not received from the GPS device;
in response to determining that the received first message includes the predefined unique identifier identifying the GPS device as the particular GPS device:
requesting, by the satellite modem, current location information from the GPS device,
receiving the current location information from the GPS device in response to the requesting of the current location information from the GPS device, and
in response to the receiving of the current location information, the satellite modem performs:
determining whether the current location information indicates a location at which the satellite modem is authorized to operate, and
when the satellite modem determines that the current location information indicates a location at which the satellite modem is not authorized to operate:
permitting the satellite modem to operate with a reduced functionality, and
transmitting a message to the network management center indicating that the satellite modem is not located at an authorized location.

10. The method of claim 9, wherein the satellite modem communicates wirelessly with the GPS device.

11. The method of claim 10, wherein the satellite modem communicates with the GPS device via WiFi.

12. The method of claim 9, wherein the satellite modem communicates with the GPS device via an inter-facility link which connects the satellite modem to an outdoor unit.

13. The method of claim 12, wherein the satellite modem communicates with the GPS device using a DiSEqC protocol.

14. The method of claim 9, wherein
when the satellite modem waits a first elapsed amount of time after the requesting of the current location information and the current location information is not received from the GPS device:
permitting the satellite modem to operate with a reduced functionality, and
transmitting a message to the network management center indicating that the satellite modem is not communicating with the GPS device.

15. The method of claim 9, further comprising:
authorizing the satellite modem to operate only when the satellite modem determines that the first message includes the predefined unique identifier.

16. The method of claim 9, further comprising retransmitting, by the GPS device, the first message including the predefined unique identifier at periodic intervals.

* * * * *